United States Patent [19]
Metcalfe et al.

[11] Patent Number: 5,696,601
[45] Date of Patent: Dec. 9, 1997

[54] SYSTEM AND METHOD FOR REDISTRIBUTING ERROR VALUES FROM AN ERROR DIFFUSION PROCESS

[75] Inventors: David J. Metcalfe, Marion; Jeng-Nan Shiau, Webster; Leon C. Williams, Walworth, all of N.Y.

[73] Assignee: Xerox Corporation, Stamford, Conn.

[21] Appl. No.: 285,265

[22] Filed: Aug. 3, 1994

[51] Int. Cl.⁶ .................................................. H04N 1/40
[52] U.S. Cl. .................... 358/447; 358/448; 358/455; 382/252; 382/254
[58] Field of Search .................... 358/443, 445, 358/447, 448, 455, 456, 457, 458, 459; 382/254, 252

[56] References Cited

U.S. PATENT DOCUMENTS

| | | | |
|---|---|---|---|
| 3,786,490 | 1/1974 | Hallock | 341/93 |
| 4,858,163 | 8/1989 | Boreland | 364/715.03 |
| 4,891,710 | 1/1990 | Nakazato et al. | 358/443 |
| 4,969,052 | 11/1990 | Ishida et al. | 358/457 |
| 5,045,952 | 9/1991 | Eschbach | 358/447 |
| 5,087,981 | 2/1992 | Ng et al. | 358/459 |
| 5,270,836 | 12/1993 | Kang | 382/254 |
| 5,271,070 | 12/1993 | Truong et al. | 382/50 |
| 5,402,506 | 3/1995 | Schafer | 358/455 |

FOREIGN PATENT DOCUMENTS

| | | |
|---|---|---|
| 0 174 721 | 3/1986 | European Pat. Off. |
| 0 356 225 | 2/1990 | European Pat. Off. |
| 0 389 164 | 9/1990 | European Pat. Off. |

*Primary Examiner*—Thomas D. Lee
*Attorney, Agent, or Firm*—Michael J. Nickerson

[57] ABSTRACT

A method and system implements a redistributive characteristic into an error diffusion process. A grey level value representing a pixel is received. A threshold circuit thresholds the received grey level value and generates an error value as a result of the threshold. A portion of the error value is diffused to adjacent pixels on a next scanline. All the error for a single pixel on the next scanline is accumulated. Since this accumulated error has a greater number of bits than can be stored in a buffer, a portion of the accumulated error is truncated and redistributed to a down stream pixel for inclusion in the downstream pixel's error accumulation process. The grey level value has a first resolution which corresponds to an original input resolution. In a high addressabilty environment, the received grey level value is interpolated to subpixel grey level values before thresholding.

29 Claims, 9 Drawing Sheets

Error Distribution

$t_N$

SYSTEM AND METHOD FOR REDISTRIBUTING ERROR VALUES FROM AN ERROR DIFFUSION PROCESS

FIELD OF THE PRESENT INVENTION

The present invention is directed to the distribution of error created from a grey level reduction process. More specifically, the present invention is related to the redistribution of error created from a truncation process within a grey level reduction process.

BACKGROUND OF THE PRESENT INVENTION

Error diffusion is a well-known method of processing grey scale images on a binary output device. One of the key ingredients in error diffusion is a requirement to propagate or diffuse the error which is generated by reducing (binarizing) the grey level value of a grey scale image. In the traditional raster order process, approximately half the error is stored in a line buffer. Moreover, using weighting coefficients, the magnitude of each stored error term never exceeds the input grey level value (typically eight bits).

Recently, improved features have been added to the error diffusion method. Specifically, it has been proposed to utilize high addressability error diffusion. A brief description of high addressability error diffusion will follow.

In explaining the high addressability error diffusion process, it is assumed that the input grey level at pixel location i and pixel location i+1 is represented by $V_i$ and $V_{i+1}$, respectively. The pixel values are assumed to be 8 bit integers wherein, for the sake of explanation, 0 denotes white and 255 denotes black. The rendering error, at the lower resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, distinct outputs can be obtained utilizing a high addressability error diffusion process. One such method of interpolation is as follows.

Initially, the modified pixel values $P0_i = V_i + e_i$ and $P1_i = V_{i+1} + e_i$ are computed. The subpixels are denoted by 0 to N-1 wherein the high addressability characteristic is N=4. The interpolated subpixel values are computed as $B_n = P0 + n(P1 + P0)/N$ for n=0 to N-1. The interpolated subpixel values are then compared with a threshold value which in most cases is 128, assuming that the video value ranges from 0 to 255.

If $B_n$ is greater than or equal to 128, the subpixel is turned ON; otherwise, the subpixel is turned OFF. The error to be propagated to downstream pixels is computed as the desired output, (P0+P1)/2, minus the actual output, namely, y*255/N wherein y is the number of subpixels turned ON. The error is then multiplied by a set of weighting coefficients and distributed to the downstream pixels as in the first version.

More specifically, the inputted modified video signal is divided into N subpixel units. The P0 and P1 values are computed as noted above. The computed subpixel values are compared with a threshold value, namely 128. If the subpixel value is greater than or equal to the threshold value, the subpixel value is set to the ON state. However, if the subpixel value is less than 128, the subpixel value is set to the OFF state.

Upon completing the comparison of all subpixel values, the number of ON subpixels are calculated. Moreover, the error from the threshold process is calculated so that the value represents the original lower spatial resolution. Upon calculating the error, the error is multiplied by weighting coefficients and distributed the error to downstream pixels.

A full description of this feature is disclosed in copending U.S. patent application, U.S. patent application Ser. No. 08/285,326, filed concurrently herewith. The entire contents of this co-pending U.S. Patent application are hereby incorporated by reference.

An example of the actual circuitry architecture used to implement the high addressabilty error diffusion process is fully disclosed in copending U.S. patent application, U.S. patent application Ser. No. 08/285,572, filed concurrently herewith. The entire contents of this copending application are hereby incorporated by reference.

While high addressability improves the versatility of error diffusion, this feature, when combined with spot-overlap compensation and/or edge enhancement, however, tends to increase the magnitude of the error component which is propagated to the downstream pixels.

An example of error diffusion of overlapping dots is fully described in U.S. Pat. No. 5,087,981. The entire contents of U.S. Pat. No. 5,087,981 are hereby incorporated by reference.

An example of edge enhancement is fully described in U.S. Pat. No. 5,045,952. The entire contents of U.S. Pat. No. 5,045,952 are hereby incorporated by reference.

Moreover, further demands on image quality will inevitably increase the grey levels of images that are scanned, processed, and stored to over eight bits. As a result, the capacity of the line buffer or buffers used to store the distributed error term for subsequent scanlines also needs to be increased.

In response to the increasing number of grey levels for an image, it is desired to develop an error diffusion technique which reduces the memory requirements of the line buffer or buffers. By reducing the memory requirements, one can reduce the system's cost of implementing a multi-level error diffusion method. More specifically, the system's cost can be reduced by requiring only a small Capacity First-in/First-Out line buffer (FIFO buffer) for storing the error term which is propagated to the pixels on the next scanline.

FIGS. 1 and 2 depict a typical weighting scheme which diffuses the error term by utilizing a simple bit shifting routine to accomplish each weighting multiplication. As illustrated in FIG. 1, the weighting coefficient for the next pixel in the same scanline is eight sixteenths wherein the weighting coefficients for the three adjacent pixels in the next scanline are two sixteenths, four sixteenths, and two sixteenths. FIG. 2 illustrates the actual error distribution of the weighting scheme of FIG. 1. More specifically, the error produced from the processing of pixel X of FIG. 1 is distributed to four adjacent downstream pixels. The error distributed to the next pixel in the same scanline is equal to one-half of the error produced in the processing of the pixel data at pixel X of FIG. 1. The error for the next pixel in the next scanline is ⅛ of the error produced from processing the pixel data at pixel X of FIG. 1.

FIGS. 3–5 illustrate typical error summation for one pixel in the next scanline as a function of pixel location and time. More specifically, FIG. 3 illustrates the error distributed and accumulated at pixel Z at time N. FIG. 4 illustrates the error that has accumulated at pixel Z at time N+1. Lastly, FIG. 5 illustrates the error accumulated at pixel Z at time N+2. It is noted that at each instance in time, a new error is produced from processing a pixel in the previous combine and that error is distributed to pixel Z as a function of different weighting coefficients depending upon the instant in time or the location of the pixel being processed.

FIG. 6 illustrates a block diagram of the typical hardware which corresponds to the summing circuit utilized to realize the results depicted in FIGS. 3–5. In FIG. 6, the error, an eight-bit dataword, is fed into an error summing circuit 20. The error summing circuit 20 sums the various errors from adjacent pixels to produce an eight-bit dataword which is stored in a FIFO buffer 30 so that when the image processing proceeds to that particular pixel, the error associated with that pixel can be used to modify the video signal before processing.

FIG. 6 further illustrates a detailed diagram of the error summing circuit 20. In the detailed diagram, flip-flops 3, 9, 13, and 15 are utilized to store past error values. For example, flip-flop 3 stores the past error value of ¼ $Err_{N+1}$, whereas flip-flop 15 stores the past error of ⅛ $Err_{N+2}$. The error summing circuit 20 also includes shifting circuits 1, 5, and 7 which provide a result representing the past error scaled by the proper weighting coefficients. Lastly, the detailed diagram of the error summing circuit 20 includes adders 11 and 12 which actually sum the weighted errors to produce the total weighted error for a particular pixel. It is noted that each flip-flop corresponds to one pixel delay.

As mentioned above, the new features which have been used to modify the typical error diffusion method have increased the memory requirements of the FIFO line buffer. More specifically, in the modified high addressability error diffusion method, the magnitude of the error component can reach as high as 12 bits. To store such a 12 bit error, two 8-bit FIFO line buffers would be required since a 12-bit line buffer is a nonstandard component. By utilizing two 8-bit FIFO line buffers, one has essentially doubled the cost of memory for the error diffusion method.

Therefore, it is desirable to implement an error diffusion process capable of handling the larger datawords of the enhanced error diffusion processes without increasing memory costs.

SUMMARY OF THE PRESENT INVENTION

A first aspect of the present invention is a method of diffusing an error created by a grey level reduction process. The method processes an image signal corresponding to a pixel on a scanline having a predetermined number of grey levels to reduce the predetermined number of grey levels to a number of grey levels renderable by an output system and generates an error from the processing. A portion of the error is distributed to predetermined pixels on a next scanline, the predetermined pixels on the next scanline receiving a portion of the error portion based on predetermined weighting coefficients. All error portions distributed to a first pixel on the next scanline are accumulated and a portion of the accumulated error portion for the first pixel are truncated. The truncated error portion is distributed to a second pixel, the second pixel being adjacent to the first pixel in a fast scan direction.

A second aspect of the present invention is a system for diffusing an error created by a grey level reduction process. The system includes processing means for processing an image signal corresponding to a pixel on a scanline having a predetermined number of grey levels to reduce the predetermined number of grey levels to a number of grey levels renderable by an output system and for generating an error from the processing and distribution means for distributing a portion of the error to predetermined pixels on a next scanline, the predetermined pixels on the next scanline receiving a portion of the error portion based on predetermined weighting coefficients. Accumulator means accumulates all error portions distributed to a first pixel on the next scanline, and truncating means truncates a portion of the accumulated error portion for the first pixel. Redistribution means distributes the truncated error portion to a second pixel, the second pixel being adjacent to the first pixel in a fast scan direction.

A third aspect of the present invention is a method of diffusing an error created by a grey level reduction process. The method processes a first image signal corresponding to a first pixel on a first scanline having a predetermined number of grey levels to reduce the predetermined number of grey levels to a number of grey levels renderable by an output system and generates an error from processing the first image signal. A portion of the error is distributed to a pixel on a second scanline, the pixel on the second scanline receiving a portion of the error portion based on predetermined weighting coefficients. The method then processes a second image signal corresponding to a second pixel on the first scanline having a predetermined number of grey levels to reduce the predetermined number of grey levels to a number of grey levels renderable by an output system and generates an error from processing the second image signal. A portion of the error is distributed to the pixel on the second scanline based on predetermined weighting coefficients. A third image signal corresponding to a third pixel on the first scanline having a predetermined number of grey levels is then processed to reduce the predetermined number of grey levels to a number of grey levels renderable by an output system. An error is generated from the processing of the third image signal. A portion of the error is distributed to the pixel on the second scanline based on predetermined weighting coefficients. All error portions distributed to the pixel on the second scanline are accumulated and a portion of the accumulated error portion for the pixel on the second scanline is truncated. The truncated error portion is distributed to a pixel adjacent to the pixel on the second scanline in a fast scan direction.

A fourth aspect of the present invention is a method of printing an image using error diffusion. The method receives an image signal corresponding to a first pixel on a scanline having a predetermined number of grey levels and processes the image signal of the first pixel to reduce the predetermined number of grey levels to a lower number of grey levels. A mark is generated on a receiving medium using the lower number of grey levels. Also, an error is generated from the processing of the image signal and a portion thereof is distributed to pixels on a next scanline, each pixel on the next scanline receiving a portion of the portion of error based on a predetermined set of weighting coefficients. All error portions distributed to a first pixel on the next scanline are accumulated and a portion of the accumulated error portion for the first pixel is truncated. The truncated error portion is distributed to a second pixel, the second pixel being adjacent to the first pixel in a fast scan direction.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, thus, are being presented for illustration purposes only, and should not be limitative of the present scope of the present invention wherein.

DETAILED DESCRIPTION OF THE DRAWINGS

Figure 1:
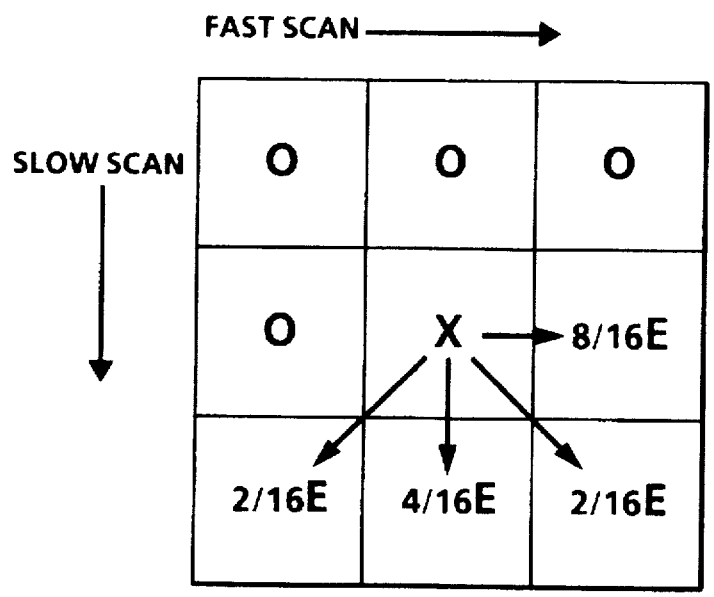
FIG. 1 shows a graphical representation of a typical error diffusion scheme.

The following will be a detailed description of the drawings illustrated in the present invention. In this description, as well as in the drawings, like reference numerals represent the devices, circuits, or equivalent circuits performed in the same or equivalent functions.

As noted above, to maintain present memory requirements and still be able to implement new error diffusion features, the width of the error dataword must be reduced; i.e., the number of bits must be reduced. By reducing the number of bits in the error term, the need for additional buffers can be avoided.

One approach to avoid the need for additional line buffers would be to truncate the least significant bits (LSBs) of the error component and send only the eight most significant bits (MSBs) to the FIFO line buffer (assuming an eight bit buffer is used). In other words, if a 12 bit error component is being produced by a high addressability error diffusion method, the four LSBs of the error component would be truncated or clipped, and only the 8 MSBs would be sent to the FIFO buffer. However, this approach is not desirable since to render images with high quality, the full error should be maintained and distributed.

Another approach to eliminate the need for additional line buffers would be to again truncate the LSBs of the error component and send only the 8 MSBs to the FIFO line buffer (assuming an eight bit buffer is used). However, in this approach, the truncated LSBs of the error component would be redistributed to the error component of another downstream pixel in the same scanline or different scanline.

As noted above, an important requirement for rendering images with high image quality is to maintain and distribute the error which is generated from transforming the grey input video into a binary image. Thus, by redistributing the LSBs of the stored error back into the error summation circuit for the next pixel's error accumulation process prior to the accumulated error for the next pixel being sent to the FIFO line buffer, the total number of bits that are sent to the FIFO line buffer can be limited to eight bits or lower, depending upon the application, and the diffused error is preserved throughout the image, thus rendering images with high print quality.

Figure 2:
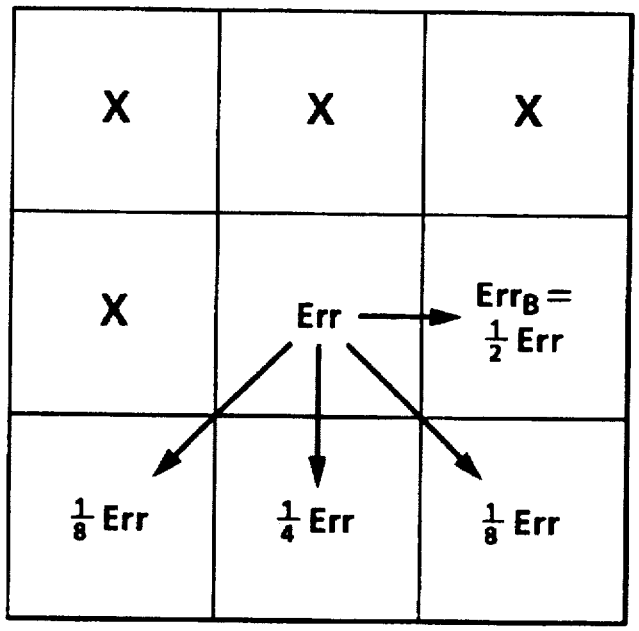
FIG. 2 shows a graphical representation illustrating actual distribution of the error in a typical error distribution routine.

FIGS. 7–10 illustrate the error summation for one pixel utilizing the error redistribution technique of the second approach, the preferred embodiment of the present invention. It is noted that the errors that are distributed to the adjacent downstream pixels are weighted utilizing the same coefficients as illustrated in FIG. 2. However, it is noted that any weighting scheme can be utilized depending upon the application being used.

Figure 3:
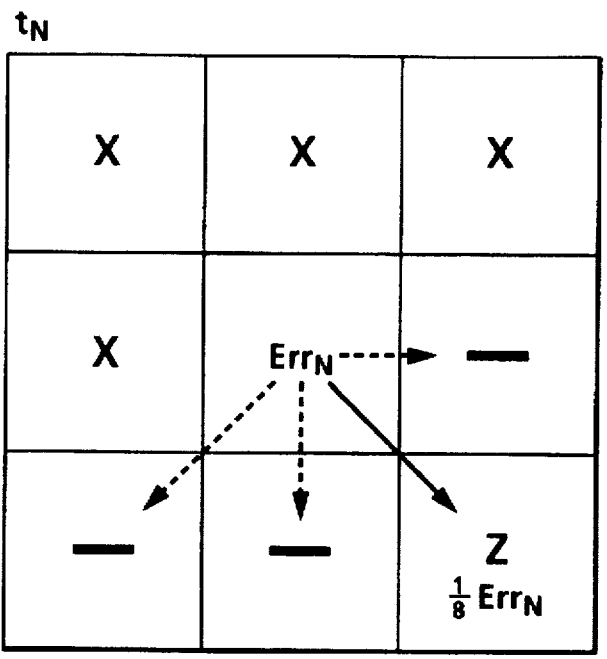
FIG. 3 shows a graphical representation of the error accumulated at a certain pixel at time N.
Figure 4:
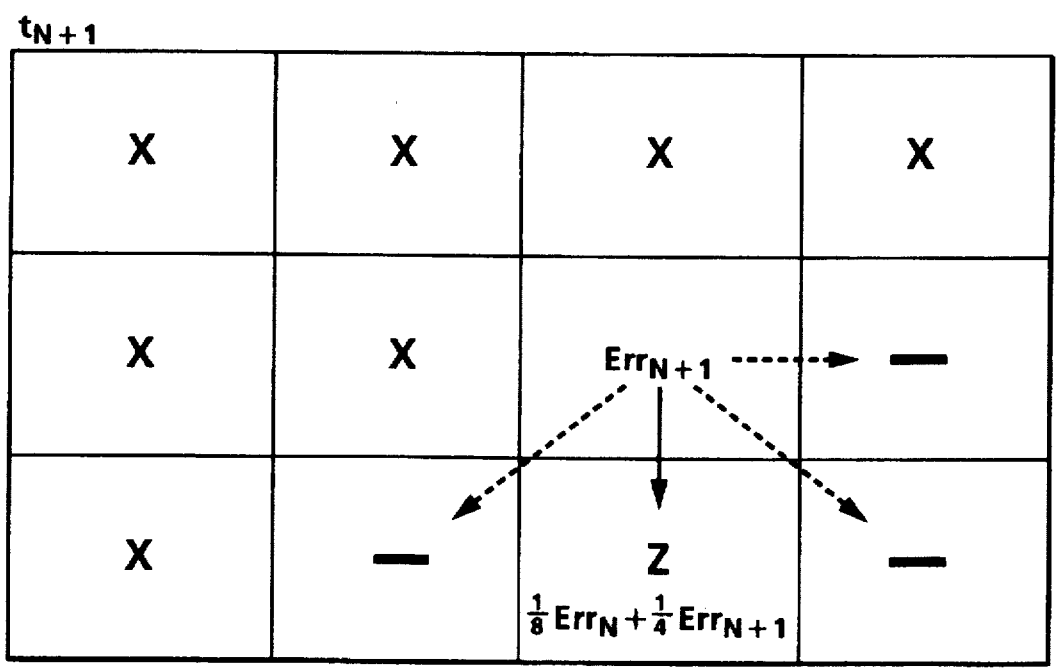
FIG. 4 shows a graphical representation of the error accumulated at a certain pixel and time N+1.
Figure 8:
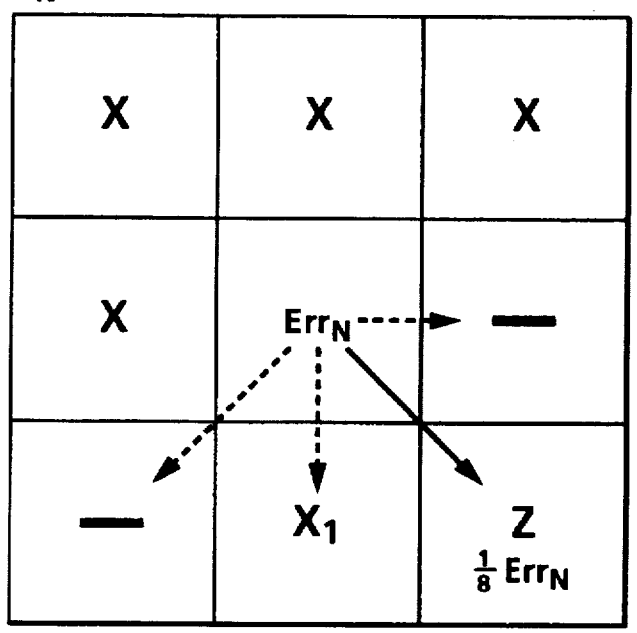
FIG. 8 shows a graphical representation illustrating the error accumulated at a certain pixel at time N according to the present invention.
Figure 9:
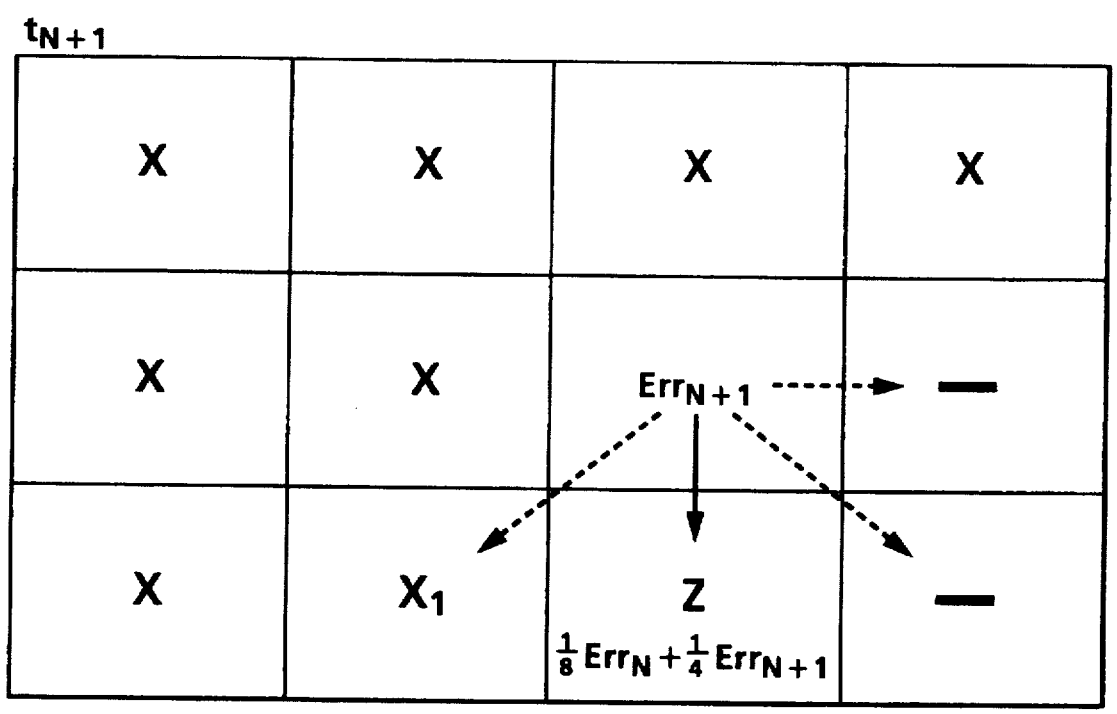
FIG. 9 shows a graphical representation illustrating the error accumulated at a certain pixel at time N+1 according to the present invention.

As in FIG. 3, FIG. 8 illustrates the error distributed to and accumulated at pixel Z during time N. Moreover, as in FIG. 4, FIG. 9 illustrates the error accumulated at pixel Z at time N+1. The actual error being accumulated, as illustrated in FIGS. 8 and 9, is essentially the same error accumulated in FIGS. 3 and 4.

Figure 5:
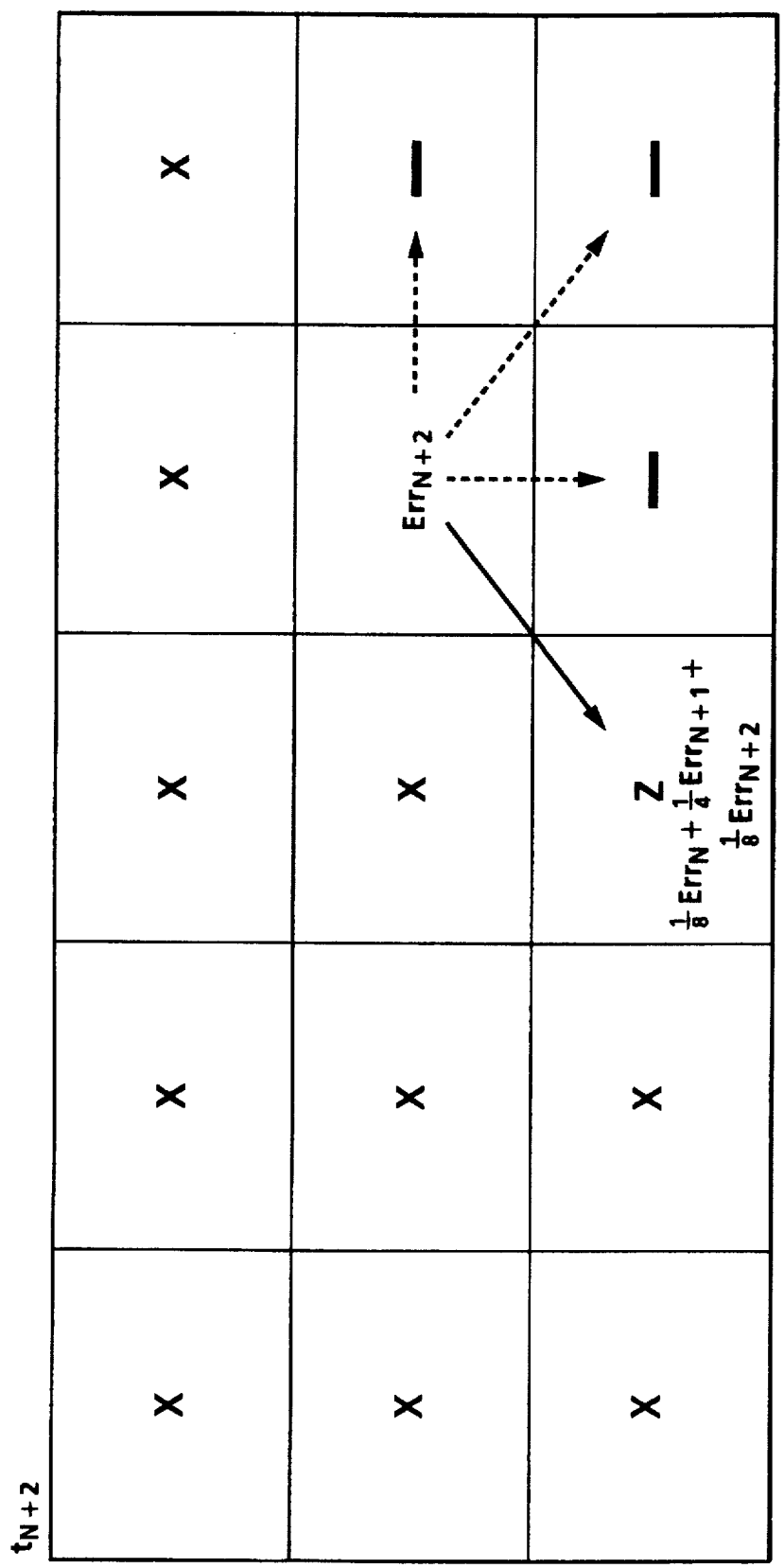
FIG. 5 shows a graphical representation illustrating the error accumulated at a certain pixel at time N+2.
Figure 10:
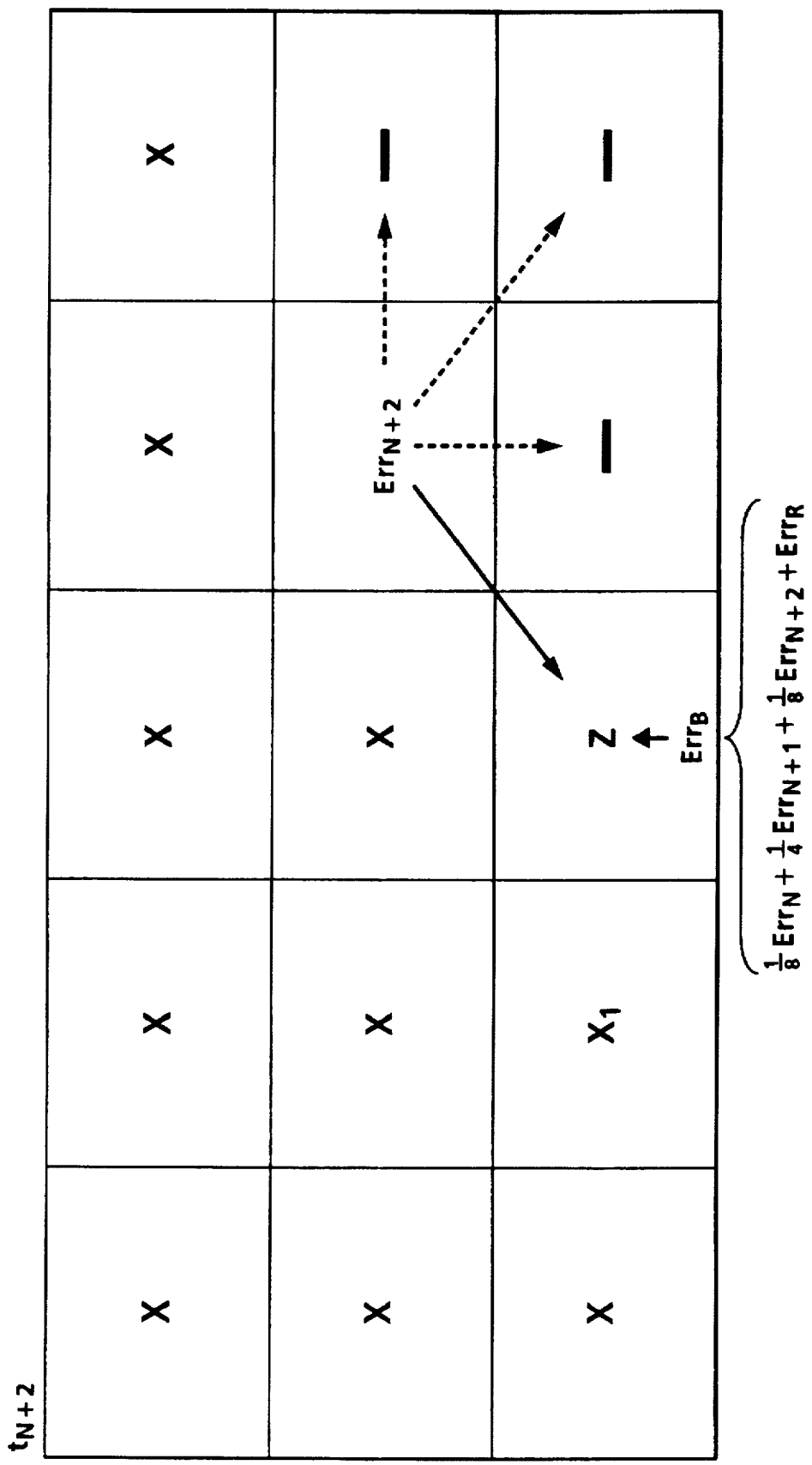
FIG. 10 shows a graphical representation illustrating the error accumulated at a certain pixel at time N+2 according to the present invention.

In FIG. 10, the error accumulated at pixel Z at time N+2 is the same error accumulated in FIG. 5 with the addition of the error term $Err_R$. The error term $Err_R$ represents the LSBs of the summed error term for the pixel $X_1$. In other words, the error ($Err_R$) accumulated at pixel Z at time N+2 is a summation of four separate error terms wherein three of the error terms are as a result of the processing of three pixels in the previous scanline and one of the error terms $Err_R$ is a result of the truncation of summed error term of the previous pixel in the same scanline, namely pixel $X_1$ as illustrated in FIG. 10.

Figure 6:
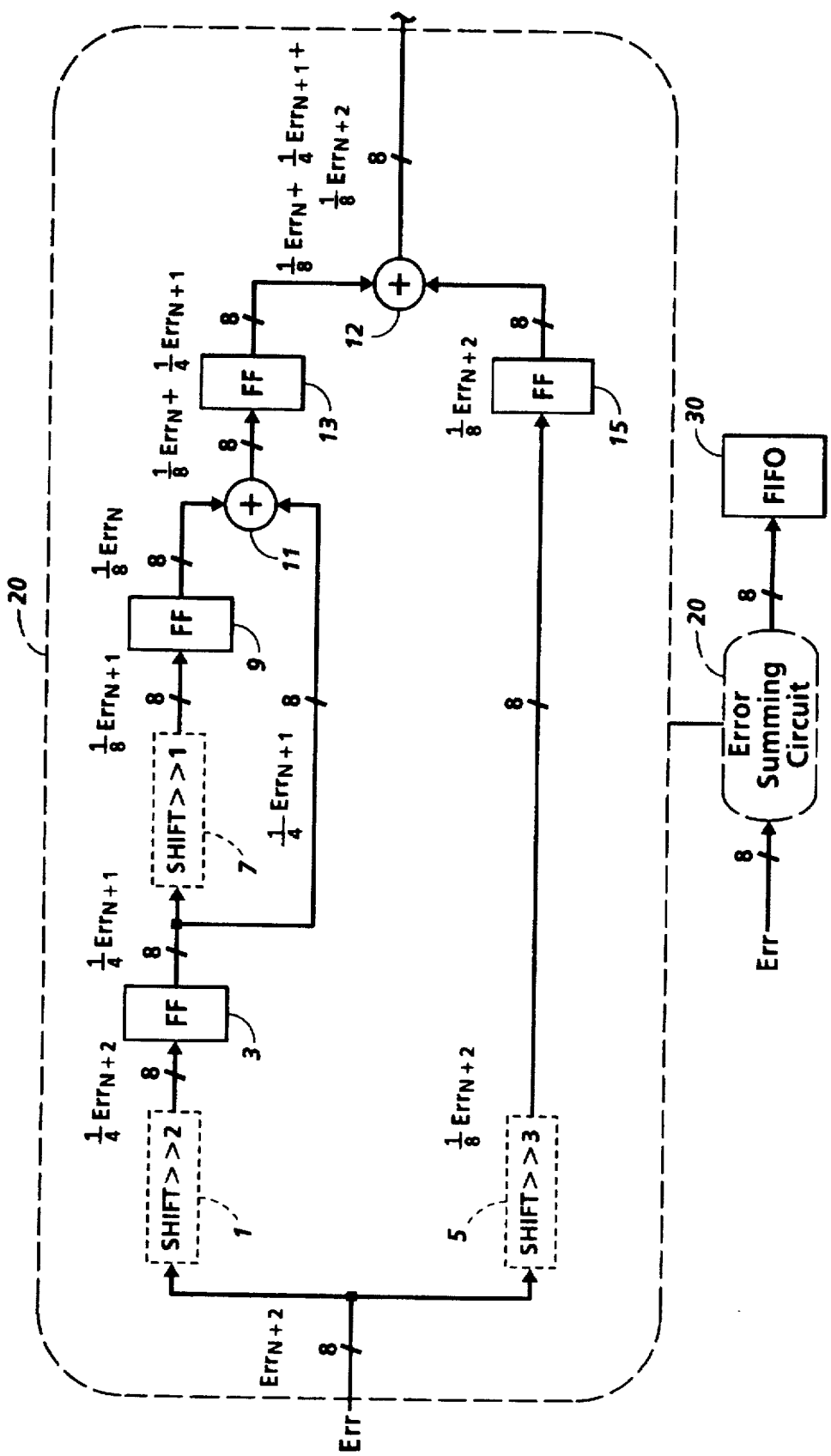
FIG. 6 Illustrates a typical error summing circuit utilized in an error diffusion process.
Figure 7:
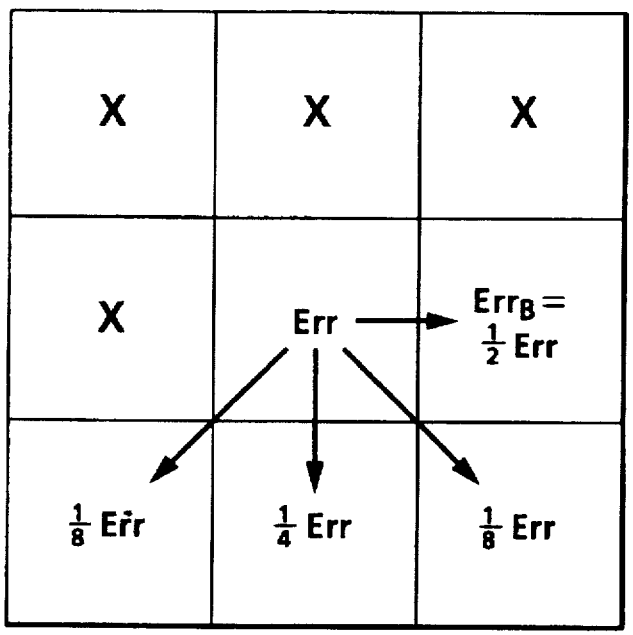
FIG. 7 shows a graphical representation of the distribution of error from processing the single pixel according to the present invention.
Figure 11:
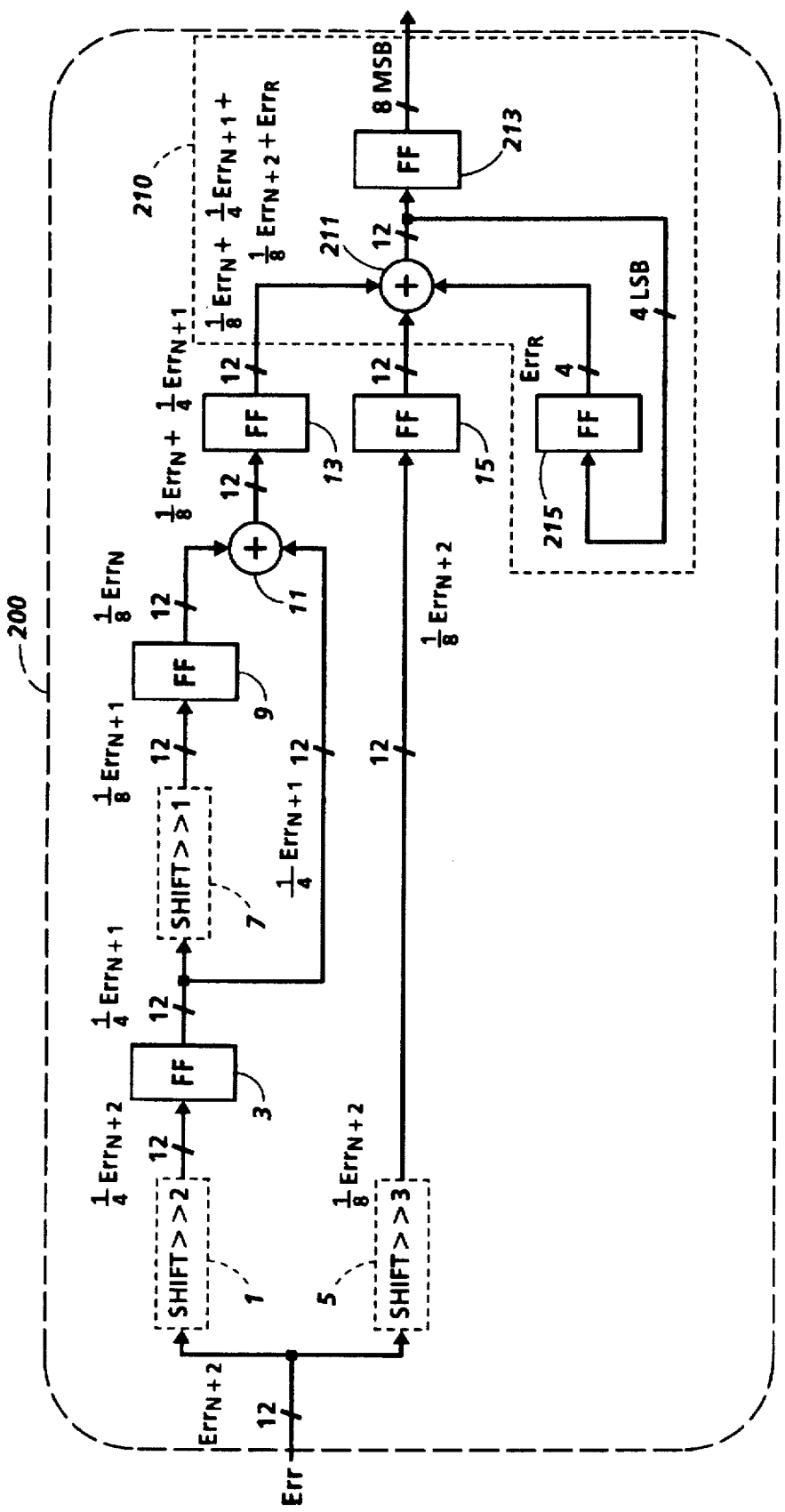
FIG. 11 shows a block diagram illustrating the error redistribution circuit of the present invention.

FIG. 11 shows a block diagram illustrating one embodiment of the error redistribution circuit of the present invention. The block diagram of FIG. 11 is substantially the same as the circuit illustrated in FIG. 6 except for the addition of two extra flip-flops and one three-input adder. More specifically, an error redistribution circuit 210 replaces the two-input adder 12 of the error summing circuit 20 illustrated in FIG. 6.

In this error redistribution circuit 210, the various error components from the typical error summing routine are fed into adder 211. Moreover, the LSBs resulting from the truncation of the previous error summing routine are fed into adder 211. This truncation error ($Err_R$) is stored from the previous error summation routine in flip-flop 215. As a result of the summation, adder 211 outputs an error component greater than eight bits.

In the example illustrated in FIG. 11, the error component comprises 12 bits. However, it is noted that the number of bits in the error component are not important since the important feature of the present invention is the truncation of the LSBs of the error component for reducing the length of the error dataword and for redistribution to the next error summing routine.

Thus, as illustrated in the example of FIG. 11, the four LSBs from the 12-bit output of adder 211 are fed into flip-flop 215. The remaining 8 MSBs are fed into flip-flop 213 which are stored prior to being fed into the FIFO line buffer 30 of FIG. 6.

Figure 12:
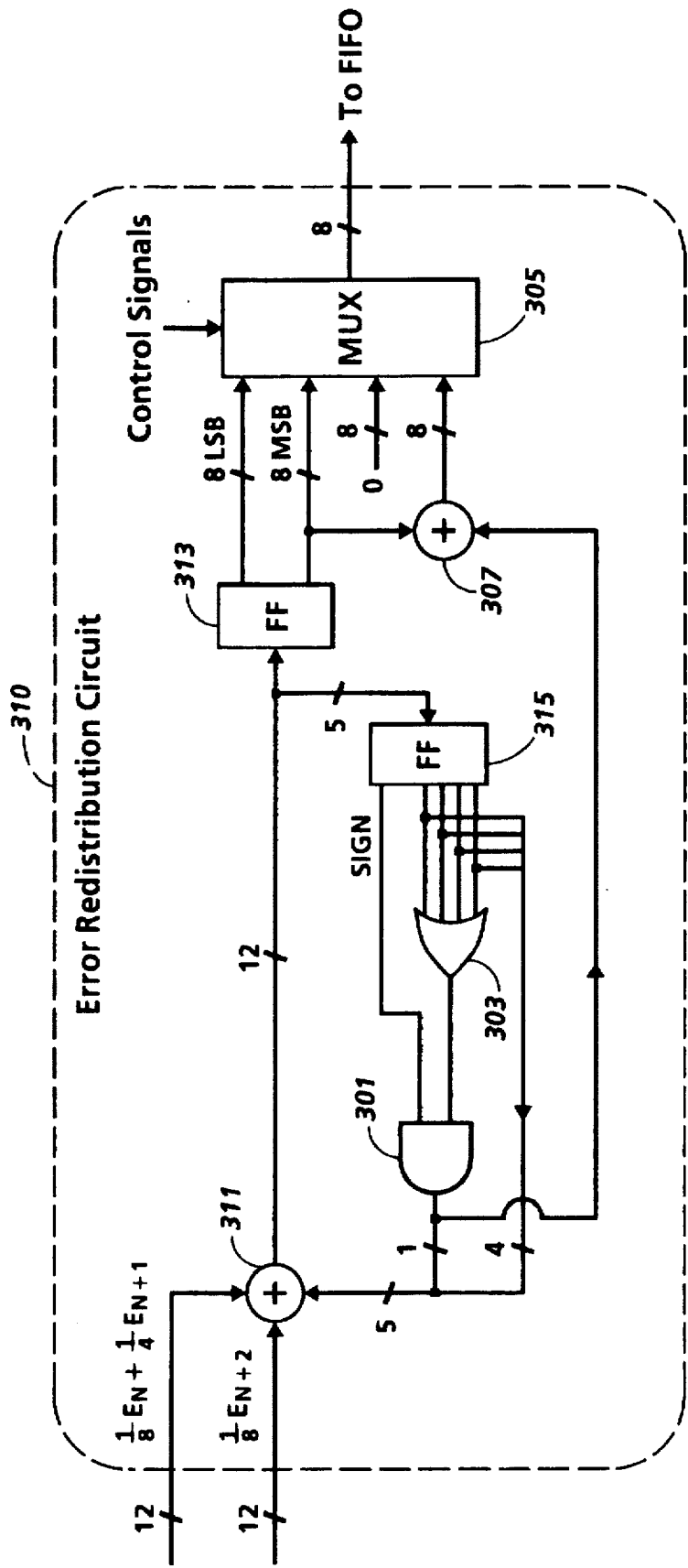
FIG. 12 shows a block diagram illustrating an error redistribution circuit of the present invention including a circuit for preventing the redistribution of a negative zero value.

FIG. 12 illustrates the error redistribution circuit of the preferred embodiment of the present invention. As in FIG. 11, the error terms from the three pixels processed in the previous scanline are fed into an adder 311 as well as 5 bits representing the redistributed error from the previous error summing routine. In this error redistribution circuit, the actual sign of the error component produced by the adder 311 is utilized in the redistribution of the LSBs of the error term.

More specifically, a flip-flop 315 stores the LSBs of the error component produced by adder 311 as well as the sign bit, whereas flip-flop 313 stores the MSBs of the error component produced by adder 311. From flip-flop 315, the LSBs of the error component are fed to an OR gate 303 wherein the ORed results are fed into an AND gate 301. The sign bit from flip-flop 315 is also fed into AND gate 301 wherein the ANDed results are fed into adder 311 and adder 307. It is further noted that the LSBs output from flip-flop 315 are also fed to adder 311 to ensure proper error redistribution.

The ANDed results from AND gate 301 are added with the MSBs stored at flip-flop 313 wherein this summation is fed to a multiplexer 305. The MSBs of flip-flop 313 are also fed to the multiplexer 305 as well as a zero value. It is noted that the LSBs of flip-flop 313 can also be fed to multiplexer 305 for utilization in certain situations. Control signals control the multiplexer to select either the MSBs received from flip-flop 313, LSBs received from flip-flop 313, the zero value, or the summation received from adder 307. The selected value is then fed to the FIFO buffer.

The circuit illustrated in FIG. 12 prevents a negative zero error from being redistributed. Moreover, it is noted that adder 307 adds a 1 for error redistribution when any of the LSBs are asserted and the sign bit indicates a negative number.

The selection by the multiplexer is operated according to the following parameters. The MSBs from the flip-flop 313 are selected when truncating the error component and no error redistribution is desired. If available, the eight LSBs from the flip-flop 313 are selected when the error component is small enough to be stored in the FIFO buffer, thereby negating a need for error redistribution, such as when the process does not produce a large error value (an error value over eight bits). Moreover, the zero value is selected when no error diffusion is desired; and the summation from adder 307 is selected when error diffusion with error redistribution is the desired process. In other words, the circuit illustrated in FIG. 12 allows the image processing module to control whether error diffusion will be implemented or not, and if it is implemented, whether it is implemented with or without error redistribution as described in the present application. The selection of these various modes of operation can be controlled by a conventional auto segmentation or image segmentation routine such as described in copending U.S. patent application, Ser. No. 08/163,784. The entire contents of Ser. No. 08/163,784 are hereby incorporated by reference.

The present invention truncates or splits the error component produced by the typical error summing circuit so that only a portion of the produced error component is stored in a FIFO line buffer for utilization in future image processing routines. The truncated or non-stored component of the error component is fed back to the error summing circuit to retain image quality. Therefore, the present invention is readily applicable to any size dataword, and is not necessarily restricted to routines having error components greater than 8 bits.

Moreover, the present invention reduces the memory requirements of the line buffer while at the same time maintaining the same level of image quality when compared against images processed via typical error diffusion. This error redistribution technique has increased importance when utilizing an error diffusion technique such as the high addressability error diffusion process discussed above. The general concepts of the present invention can also be utilized in other applications such as color error diffusion to further decrease the memory requirements, but maintain the same level of image quality.

Although, the present invention has been described in conjunction with a high addressability error diffusion process, it can be readily implemented with any error diffusion process requiring a large number of bits for processing. Moreover, the present invention can be readily implemented with an error diffusion process which does not require a large number of bits for processing in order to achieve better print quality. For example, in a screening and high addressability error diffusion process, the propagated error component never exceeds 8-bits, thus one would not apply the error redistribution process of the present invention. However, the present invention is utilized in such a situation, the present invention actually improves white-to-black gradation of the rendered image. A full description of a screening/high addressability error diffusion process which benefits from the error redistribution process of the present invention is fully disclosed in copending U.S. patent application, U.S. patent application Ser. No. 08/285,328, filed concurrently herewith. The entire contents of this copending U.S. patent application are hereby incorporated by reference.

The present invention has been described in detail above; however, various modifications can be implemented without departing from the spirit of the present invention. For example, the preferred embodiment of the present invention has been described with respect to a printing system; however, this error diffusion redistribution method is readily implemented in a display system. Moreover, the error diffusion redistribution method of the present invention can be readily implemented on an ASIC, thereby enabling the placement of this process in a scanner, electronic subsystem, printer, or display device.

Moreover, the present invention has been described with respect to a video range of 0 to 255. However, it is contemplated by the present invention that the video range can be any suitable range to describe the grey level of the pixel being processed. Furthermore, the present invention is readily applicable to any rendering system, not necessarily a binary output device. It is contemplated that the concepts of the present invention are readily applicable to a four-level output terminal or higher.

Lastly, the present invention has been described with respect to a monochrome or black/white environment. However, the concepts of the present invention are readily applicable to a color environment. Namely, the error diffusion redistribution process of the present invention can be applied to each color space value representing the color pixel.

In recapitulation, the present invention provides an error diffusion redistribution method or module which enables an image processing system to convert an electronic document of one format to that of another format wherein the rendering resolution is higher than the resolution of the error.

While the present invention has been described with reference to various embodiments disclosed herein before, it is not to be combined to the detail set forth above, but is intended to cover such modifications or changes as made within the scope of the attached claims.

What is claimed is:

1. A method of diffusing an error created by a grey level reduction process, comprising the steps of:

(a) processing an image signal corresponding to a pixel on a scanline having a predetermined number of grey levels to reduce the predetermined number of grey levels to a number of grey levels renderable by an output system;

(b) generating an error from the processing in said step (a);

(c) distributing a portion of the error to predetermined pixels on a next scanline, the predetermined pixels on the next scanline receiving a portion of the error portion based on predetermined weighting coefficients;

(d) adding together all error portions distributed to a first pixel on the next scanline to produce an error sum for the first pixel;

(e) performing a truncation process upon the error sum for the first pixel to generate a truncated error sum value and a remaining error portion value; and (f) distributing the truncated error sum value to a second pixel, the second pixel being adjacent to the first pixel in a fast scan direction.

2. The method as claimed in claim 1, further comprising the step of:

(g) storing the remaining error portion value.

3. The method as claimed in claim 1, further comprising the step of:

(g) preventing a negative zero from being distributed by said step (f).

4. The method as claimed in claim 1, wherein said step (a) comprises the substeps of:

(a1) receiving the image signal representing the pixel, the grey level value having a first resolution;

(a2) conventing the image signal to a second resolution, the second resolution being higher than the first resolution; and (a3) thresholding the convented image signal.

5. The method as claimed in claim 4, wherein said substep (a2) comprises the substeps of:

(a2i) computing a first grey level value from the image signal;

(a2ii) computing a second grey level value from the image signal; and (a2iii) computing a plurality of subpixel grey level values $B_n$, the subpixel grey level values $B_n$ being equal to $P0+n(P1-P0)/N$, wherein n is equal to 0 to N-1, P0 is equal to the first grey level value, P1 is equal to the second grey value, and N is equal to a high addressability characteristic.

6. The method as claimed in claim 5, wherein said step (b) comprises the substeps of:

(b1) calculating a desired output, the desired output being equal to a sum of the first and second grey level values divided by two;

(b2) calculating an actual output, the actual output being equal to a number of subpixels being equal to or greater than a threshold value multiplied by a maximum grey level value for a pixel divided by a high addressability characteristic; and (b3) calculating the error to be equal to the desired output minus the actual output.

7. The method as claimed in claim 5, further comprising the step of:

(g) screening the image signal with a predetermined screen prior to the execution of said step (a).

8. The method as claimed in claim 7, wherein said step (b) comprises the substeps of:

(b1) calculating a desired output, the desired output being equal to a sum of the first and second multi-level grey scale pixel values divided by two;

(b2) calculating an actual output, the actual output being equal to a lowest screen value of the screen plus a number of subpixels being equal to or greater than a threshold value multiplied by a difference between a maximum screen value of the screen and the lowest screen value of the screen divided by a high addressability characteristic; and (b3) calculating the error value to be equal to the desired output minus the actual output.

9. The method as claimed in claim 1, wherein the truncated error sum value is the four least significant bits of the error sum of the first pixel.

10. A system for diffusing an error created by a grey level reduction process, comprising:

processing means for processing an image signal corresponding to a pixel on a scanline having a predetermined number of grey levels to reduce the predetermined number of grey levels to a number of grey levels renderable by an output system and for generating an error from the processing;

distribution means for distributing a portion of the error to predetermined pixels on a next scanline, the predetermined pixels on the next scanline receiving a portion of the error portion based on predetermined weighting coefficients;

adding means for adding together all error portions distributed to a first pixel on the next scanline to produce an error sum for the first pixel;

truncating means for truncating the error sum for the first pixel to generate a truncated error sum value and a remaining error portion value; and redistribution means for distributing the truncated error sum value to a second pixel, the second pixel being adjacent to the first pixel in a fast scan direction.

11. The system as claimed in claim 10, further comprising: means for storing the remaining error portion value.

12. The system as claimed in claim 10, further comprising:

means for preventing a negative zero from being distributed by said redistribution means.

13. The system as claimed in claim 10, wherein said processing means comprises:

input means for receiving the image signal representing the pixel, the grey level value having a first resolution;

converting means for converting the image signal to a second resolution, the second resolution being higher than the first resolution;

threshold means for thresholding the converted image signal and for generating an error value as a result of the thresholding.

14. The system as claimed in claim 13, wherein said converting means comprises:

first means for computing a first grey level value from the image signal and a second grey level value from the image signal; and second means for computing a plurality of subpixel grey level values $B_n$, the subpixel grey level values $B_n$ being equal to $P0+n(P1-P0)/N$, wherein n is equal to 0 to N-1, P0 is equal to the first grey level value, P1 is equal to the second grey value, and N is equal to a high addressability characteristic.

15. The system as claimed in claim 14, wherein said threshold means comprises:
   first means for calculating a desired output, the desired output being equal to a sum of the first and second grey level values divided by two;
   second means for calculating an actual output, the actual output being equal to a number of subpixels being equal to or greater than a threshold value multiplied by a maximum grey level value for a pixel divided by a high addressability characteristic; and
   third means for calculating the error to be equal to the desired output minus the actual output.

16. The system as claimed in claim 14, further comprising:
   screen means for screening the image signal before the image signal is processed by said processing means.

17. The system as claimed in claim 16, wherein said threshold means comprises:
   first means for calculating a desired output, the desired output being equal to a sum of the first and second multi-level grey scale pixel values divided by two;
   second means for calculating an actual output, the actual output being equal to a lowest screen value of the screen plus a number of subpixels being equal to or greater than a threshold value multiplied by a difference between a maximum screen value of the screen and the lowest screen value of the screen divided by a high addressability characteristic; and
   third means for calculating the error value to be equal to the desired output minus the actual output.

18. The system as claimed in claim 10, wherein said truncated error sum value is the four least significant bits of the error sum of the first pixel.

19. A method of diffusing an error created by a grey level reduction process, comprising the steps of:
   (a) processing a first image signal corresponding to a first pixel on a first scanline having a predetermined number of grey levels to reduce the predetermined number of grey levels to a number of grey levels renderable by an output system;
   (b) generating an error from processing the first image signal in said step (a);
   (c) distributing a portion of the error to a pixel on a second scanline, the pixel on the second scanline receiving a portion of the error portion based on predetermined weighting coefficients;
   (d) processing a second image signal corresponding to a second pixel on the first scanline having a predetermined number of grey levels to reduce the predetermined number of grey levels to a number of grey levels renderable by an output system;
   (e) generating an error from processing the second image signal in said step (d);
   (f) distributing a portion of the error to the pixel on the second scanline, the pixel on the second scanline receiving a portion of the error portion based on predetermined weighting coefficients;
   (g) processing a third image signal corresponding to a third pixel on the first scanline having a predetermined number of grey levels to reduce the predetermined number of grey levels to a number of grey levels renderable by an output system;
   (h) generating an error from processing the third image signal in said step (g);
   (I) distributing a portion of the error to the pixel on the second scanline, the pixel on the second scanline receiving a portion of the error portion based on predetermined weighting coefficients;
   (j) adding together all error portions distributed to the pixel on the second scanline to produce an error sum for the pixel;
   (k) performing a truncation process upon the error sum for the pixel on the second scanline to generate a truncated error sum value and a remaining error portion value; and
   (l) distributing the truncated error sum value to a pixel adjacent to the pixel on the second scanline in a fast scan direction.

20. The method as claimed in claim 19, further comprising the step of:
   (m) storing the remaining error portion value.

21. The method as claimed in claim 19, further comprising the step of:
   (m) preventing a negative zero from being distributed by said step (I).

22. The method as claimed in claim 19, wherein each of said steps (a), (d), and (g) comprise the substeps of:
   (adg1) receiving an image signal, the image signal having a first resolution;
   (adg2) converting the image signal to a second resolution, the second resolution being higher than the first resolution; and
   (adg3) thresholding the converted image signal.

23. The method as claimed in claim 22, wherein said substep (adg2) comprises the substeps of:
   (adg2i) computing a first grey level value from the image signal;
   (adg2ii) computing a second grey level value from the image signal; and
   (adg2iii) computing a plurality of subpixel grey level values $B_n$, the subpixel grey level values $B_n$ being equal to $P0+n(P1-P0)/N$, wherein n is equal to 0 to N-1, P0 is equal to the first grey level value, P1 is equal to the second grey value, and N is equal to a high addressability characteristic.

24. The method as claimed in claim 23, wherein wherein each of said steps (b), (e), and (h) comprise the substeps of:
   (beh1) calculating a desired output, the desired output being equal to a sum of the first and second grey level values divided by two;
   (beh2) calculating an actual output, the actual output being equal to a number of subpixels being equal to or greater than a threshold value multiplied by a maximum grey level value for a pixel divided by a high addressability characteristic; and
   (beh3) calculating the error to be equal to the desired output minus the actual output.

25. The method as claimed in claim 23, further comprising the steps of:
   (m) screening the first image signal with a predetermined screen prior to the execution of said step (a);
   (n) screening the second image signal with a predetermined screen prior to the execution of said step (d);
   (o) screening the third image signal with a predetermined screen prior to the execution of said step (g).

26. The method as claimed in claim 25, wherein each of said steps (b), (e), and (h) comprise the substeps of:

(beh1) calculating a desired output, ;the desired output being equal to a sum of the first and second multi-level grey scale pixel values divided by two;

(beh2) calculating an actual output, the actual output being equal to a lowest screen value of the screen plus a number of subpixels being equal to or greater than a threshold value multiplied by a difference between a maximum screen value of the screen and the lowest screen value of the screen divided by a high addressability characteristic; and (beh3) calculating the error value to be equal to the desired output minus the actual output.

27. The method as claimed in claim 19, wherein the truncated error sum value is the four least significant bits of the error sum of the pixel on the second scanline.

28. A method of printing an image using error diffusion, comprising the steps of:

(a) receiving an image signal corresponding to a first pixel on a scanline having a predetermined number of grey levels;

(b) processing the image signal of the first pixel to reduce the predetermined number of grey levels to a lower number of grey levels;

(c) generating a mark on a receiving medium using the lower number of grey levels;

(d) generating an error from the processing of the image signal in said step Co);

(e) distributing a portion of the error to pixels on a next scanline, each pixel on the next scanline receiving a portion of the portion of error based on a predetermined set of weighting coefficients;

(f) adding together all error portions distributed to a first pixel on the next scanline to produce an error sum for the first pixel;

(g) performing a truncation process upon the error sum for the first pixel on the next scanline to generate a truncated error sum value and a remaining error portion value; and (h) distributing the truncated error sum value to a second pixel, the second pixel being adjacent to the first pixel on the next scanline in a fast scan direction.

29. The method as claimed in claim 28, wherein the truncated error sum value is the four least significant bits of the error sum of the first pixel on the next scanline.

* * * * *